(12) United States Patent
Kleewein et al.

(10) Patent No.: US 7,460,316 B2
(45) Date of Patent: Dec. 2, 2008

(54) LENS ARRANGEMENT FOR INTEGRATION INTO A WALL, A WALL-INTEGRATED DEVICE INCORPORATING THE LENS ARRANGEMENT, AND METHOD OF INSTALLING THE DEVICE

(75) Inventors: Gerhard Kleewein, Pressbaum (AT); Thomas Pollheimer, Vienna (AT); Dirk Blondiau, Vienna (AT); Gerhard Stoiber, Gösting (AT)

(73) Assignee: inventio AG, Hergiswil (CH)

( * ) Notice: Subject to any disclaimer, the term of this patent is extended or adjusted under 35 U.S.C. 154(b) by 103 days.

(21) Appl. No.: 11/356,783

(22) Filed: Feb. 17, 2006

(65) Prior Publication Data

US 2006/0181868 A1 Aug. 17, 2006

(30) Foreign Application Priority Data

Feb. 17, 2005 (EP) .................................. 05101181

(51) Int. Cl.
*G02B 7/02* (2006.01)
(52) U.S. Cl. ........................ 359/811; 359/819; 362/146; 362/147
(58) Field of Classification Search ................. 359/811, 359/819; 362/146, 147, 455; 198/324; 340/815.49, 340/815.5, 815.57, 815.73, 815.75, 815.76
See application file for complete search history.

(56) References Cited

U.S. PATENT DOCUMENTS

| 3,611,360 | A | * | 10/1971 | Bailey | .................... 340/815.51 |
| 4,035,681 | A | * | 7/1977 | Savage, Jr. | .................. 313/110 |
| 5,848,839 | A | | 12/1998 | Savage, Jr. | |
| 2004/0061957 | A1 | | 4/2004 | Savage, Jr. | |

FOREIGN PATENT DOCUMENTS

| GB | 2 025 596 A | 1/1980 |
| JP | 03259895 A | 11/1991 |

* cited by examiner

*Primary Examiner*—Joseph Martinez
(74) *Attorney, Agent, or Firm*—Schweitzer Cornman Gross & Bondell LLP

(57) ABSTRACT

A wall-integrable lens arrangement and a wall-integrated device with a connection housing and such a lens arrangement includes a connection housing having a radiation-emitting element. The connection housing is arranged on a first side of a wall and has an attachment portion and a connecting member. A lens arrangement has a lens head that is transparent to the radiation and an attachment portion and a connection member. The wall has a wall breakthrough through which at least one of the attachment portions projects, the connection members of the connection housing and the lens arrangement being mutually engaged. The wall breakthrough and at least one of the attachment portions that projects through it are complementary and formed in such a manner that the lens arrangement is maintained in a pre-specified horizontal position or rotational position and secured in the position against rotation.

14 Claims, 5 Drawing Sheets

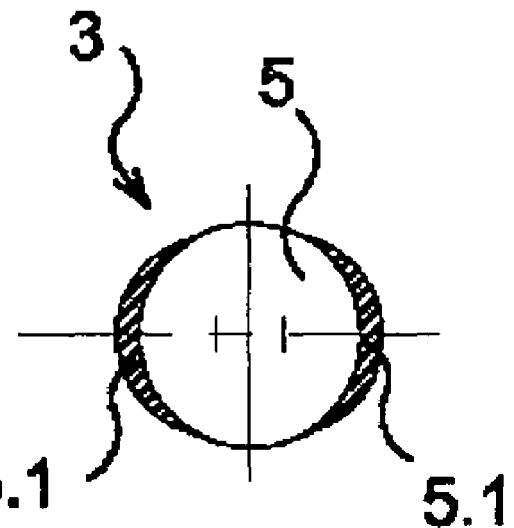
Fig. 2A
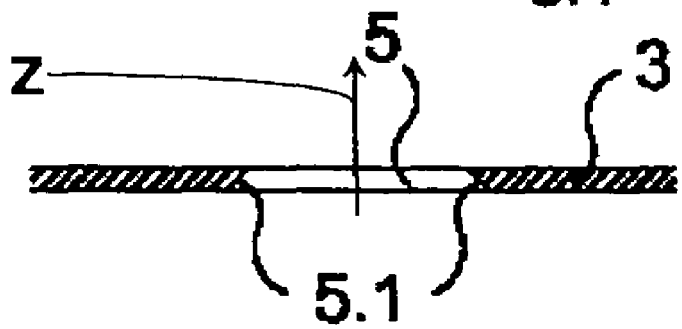
Fig. 2B
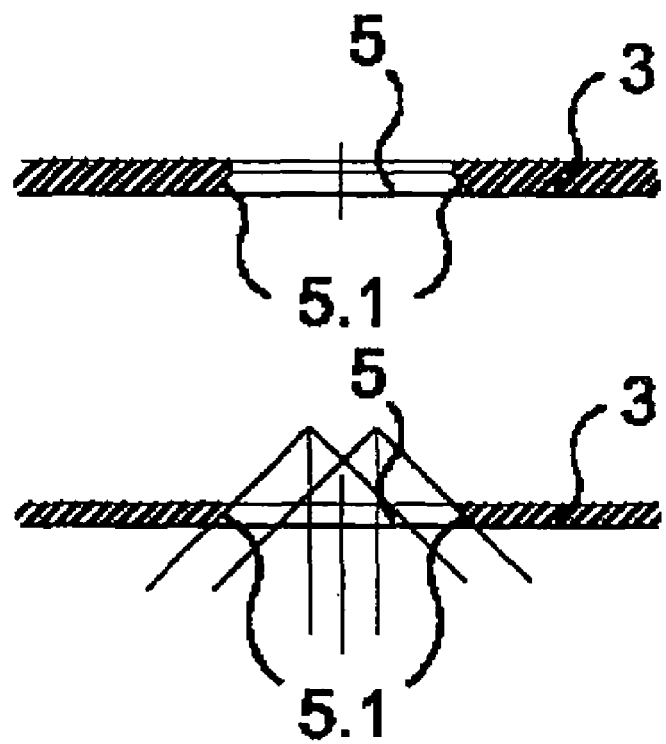
Fig. 2C
Fig. 2D

Fig. 3A
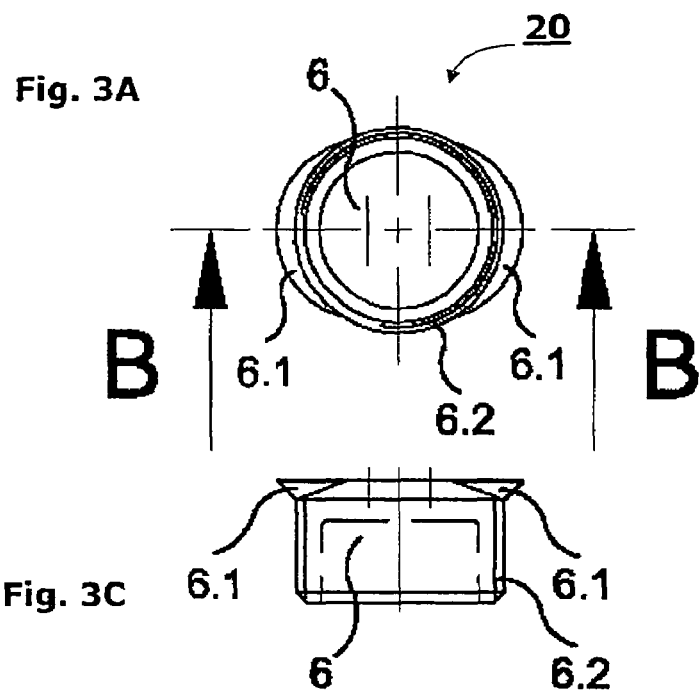
Fig. 3B
Fig. 3C
Schnitt B-B
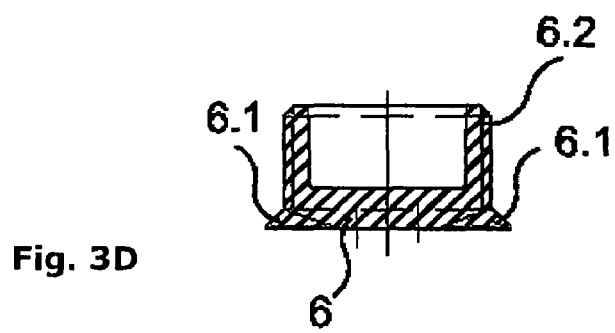
Fig. 3D

LENS ARRANGEMENT FOR INTEGRATION INTO A WALL, A WALL-INTEGRATED DEVICE INCORPORATING THE LENS ARRANGEMENT, AND METHOD OF INSTALLING THE DEVICE

The present invention relates to a wall-integrable lens arrangement, a wall-integrated device with such a lens arrangement and with a connection housing, a method of installing the device, and a transportation installation with such a device.

BACKGROUND OF THE INVENTION

The terms "wall-integrable" and "wall-integrated" are to be understood as meaning that the lens arrangement lies largely, but not necessarily completely, within the bounding surfaces of a wall. Wall-integrated devices of this type are used, for example, for monitoring and/or lighting areas of a room.

U.S. Pat. No. 6,785,053 describes a device of this type. A connection housing that contains a radiation-emitting element is arranged essentially on one side of a wall. A lens arrangement has a lens head that is transparent to the radiation and is arranged at least partly on the other side of the wall and guides the radiation to this other side of the wall. The connection housing has an attachment portion with a connection member in the form of an inside thread.

The lens arrangement has a connection member in the form of an external thread that is complementary to the internal thread of the housing connection member. The wall has a wall breakthrough or opening through which the lens connection member projects. The two connecting members are mutually engaged in such manner that the connection box and the lens arrangement are fixed relative to each other and in the wall breakthrough.

Devices of this type can be used, for example, for lighting the lower area of transportation installations such as escalators, moving walks, and elevators. When so used, a large number of the lens arrangements are inserted in a series of breakthroughs in a wall that is located at the side of the step-band of an escalator or the pallet-band of a moving walk. The wall can be a skirt panel or a balustrade wall. The lens heads are so formed that they can only be inserted into the wall breakthrough from the step-side or pallet-side of the wall that faces toward the escalator or moving walk. The connection box is located on the side of the wall that faces away from the escalator or moving walk.

When the device known from U.S. Pat. No. 6,785,053 is used in connection with a transportation installation, various disadvantages arise. In particular, the device cannot be installed in the wall breakthrough in a pre-specified position regarding its rotation or angle relative to an axis perpendicular to the wall. Such a facility would, however, be desirable to direct the radiation into a particular area.

In addition, the described and similar known devices that are provided for lighting escalators and moving walks are disadvantageous in that they are manufactured from numerous constructional components so that their assembly and their installation are relatively complicated and therefore time-intensive, and that many installation steps have to take place in situ.

It is accordingly the purposes of the present invention to avoid the disadvantages of the state of the art by providing an improved wall-integrable lens arrangement of the type stated at the outset; providing an improved wall-integrated device of the type stated at the outset with an adjustable lens arrangement; and by providing a method of installing the new device.

BRIEF DESCRIPTION OF THE INVENTION

In accordance with the invention, the foregoing and other purposes and objects are met by a lighting device comprising a lens arrangement and a housing to which the lens arrangement is joined. The lens arrangement has an attachment or connecting member formed so as to mount in a pre-specified or determined position in a complementary wall breakthrough. The lens arrangement is inserted through the wall breakthrough from a first side of the wall and fully engaged with the breakthrough such that it is in the intended fixed position. The housing is then mounted upon the lens arrangement from the second side of the wall. The device may be mounted, for example, in a transportation installation, such as an escalator, moving walk or elevator.

In the invention, the wall breakthrough on the one hand and a housing attachment or lens attachment on the other hand are formed complementarily to each other, but not central-symmetrically; in such manner, the lens arrangement is arranged in a pre-specified rotational position in the wall breakthrough and is secured in that position.

The device according to the invention is of simple construction and simple to install. It is possible to install the device in a pre-specified horizontal or rotational position without additional tools or special skills or special attention since, to a certain degree it automatically assumes the pre-defined desired position as it is being inserted.

The new device is particularly suitable for applications in association with the use of radiation for lighting or illuminating or monitoring transportation installations, wherein the wall in which the device is mounted is a wall portion of a transportation installation that is located in the area of objects or persons that move relative to the wall and therefore relative to the lens head. Installing the device in a certain pre-specified rotational position avoids the potential of light falling in an undesired direction and, on the one hand, perhaps dazzling the persons being transported while, on the other hand, the foot area, where lighting would be desirable, remains unlit.

Thanks to the pre-specified positioning of the device upon installation, the invention advantageously makes it possible to build into the lens arrangement reflectors or other elements that influence the radiation and which serve to direct and/or control the radiation and with which the radiation can be very precisely directed and/or guided.

It has proved advantageous to use a lens arrangement whose lens head is so formed as to be a flush continuation of the surface of the wall. A concave or convex embodiment of the lens heads can, however, also be implemented. In the case of a flat wall, such a lens head may also be arranged generally flat and flush with the wall surface. This facilitates cleaning of the wall and of the visible part of the lens head and prevents deliberate damage that can be caused by objects moving relative to the wall. In addition, acts of vandalism are less readily provoked and more difficult to commit. This notwithstanding, hemispherical, otherwise projecting or inwardly curved embodiments of the lens head are also feasible.

In a preferred exemplary embodiment the wall breakthrough has a wall contact surface and the lens- or housing-end attachment that projects through the wall has a corresponding attachment contact surface. The contact surfaces that are provided for mutual contact are rotation-asymmetrical relative to an axis perpendicular to the wall. As a result, provided that the wall breakthrough is correctly and carefully positioned and executed, the lens arrangement installs into the desired position more or less of its own accord. In their installed state, the two contact surfaces touch each other at least partly and are preferably so pressed against each other that the lens arrangement and the connection housing are perfectly fastened to each other and to the wall.

To create the wall breakthrough and the attachment touching it, it is particularly advantageous if the wall breakthrough and/or the attachment touching it are bounded by two partly overlapping cylindrical surfaces, since such a construction allows working with conventional manufacturing methods and with circular relative movements between a workpiece and a tool.

In a preferred embodiment, the wall breakthrough is an essentially cylindrical bored hole which in at least one sector has at least one tapering wall contact surface extending over a part of the length of its bore. The attachment touching the wall breakthrough has a cylindrical outer wall that is complementary to the wall contact surface and has attachment contact surfaces that rest against the latter.

In a particularly advantageous embodiment of the new device, the attachment that touches the bounding surface is on the lens arrangement, and the lens arrangement's connecting member is a thread, preferably an external thread.

In frequent applications of the invention, the radiation-emitting element may be a light-emitting element and the lens head is made at least partly, or fully (completely), of a material that is transparent to the light of the emitting element.

BRIEF DESCRIPTION OF THE DRAWINGS

Further details and advantages of the invention are explained below in relation to exemplary embodiments and by reference to the annexed drawings, wherein:

FIG. 2A is an elevation view of a wall breakthrough of a wall, viewed in the direction of the longitudinal axis of the wall breakthrough;

FIG. 2B is a sectional view of a wall and wall breakthrough taken along the longitudinal axis of the wall breakthrough;

FIG. 2C is a sectional view of a wall with a differently formed wall breakthrough, in a corresponding view as in FIG. 2B;

FIG. 2D is a sectional view of a wall with a wall breakthrough according to FIG. 2B with a diagrammatically indicated representation of the manufacture of the wall breakthrough;

FIG. 3A is a front view of a lens arrangement of the invention;

FIG. 3B is a side view of the lens arrangement shown in FIG. 3A;

FIG. 3C is a top plan view of the lens arrangement;

FIG. 3D is a sectional view taken along the line B-B of FIG. 3A;

DETAILED DESCRIPTION OF THE INVENTION

Figure 1A:
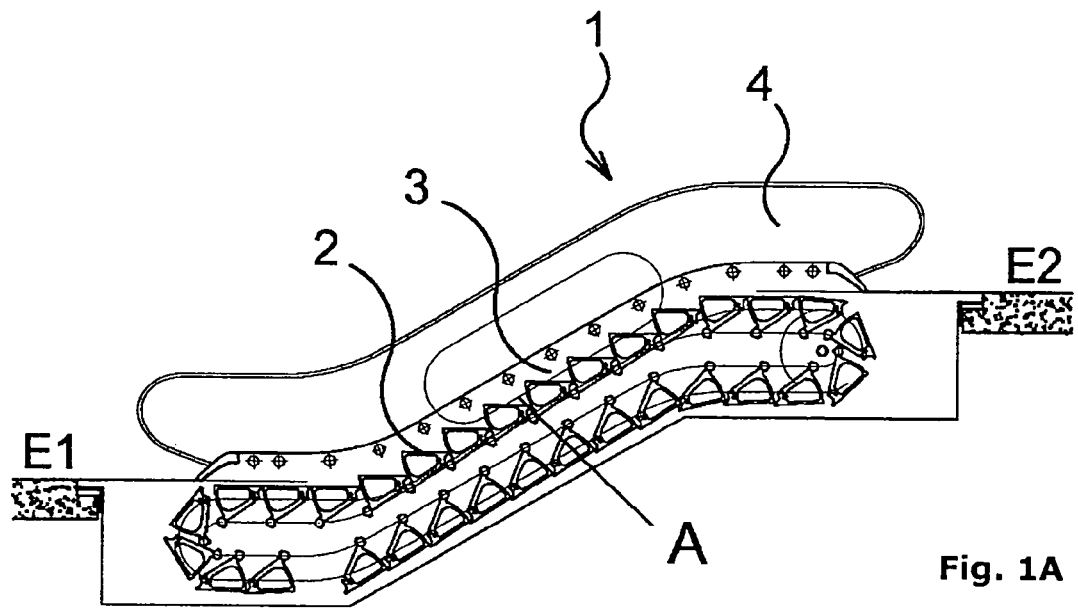
FIG. 1A is a schematic side view, partially cut away, of an escalator with a device according to the invention.

FIG. 1A shows an escalator that connects a lower level E1 with an upper level E2 and that is equipped with a device 1 according to the invention. The escalator has a step band 2 with a large number of steps that are connected to each other. Arranged on each side of the movable step band 2 is a locationally fixed skirt panel 3. As lateral boundaries the escalator 1 has in the lower part the skirt panels 3 and in the upper part locationally fixed balustrades 4, the top of which normally supports a handrail that is movable with the step band 2.

Figure 1B:
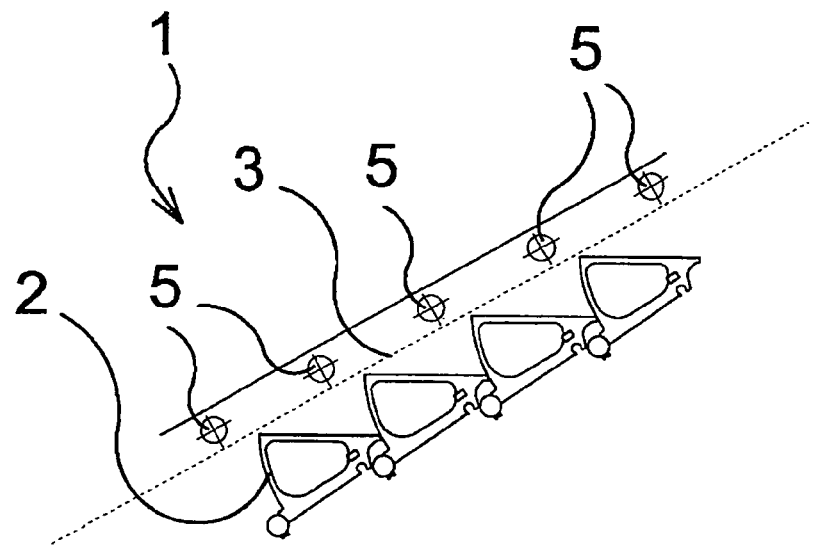
FIG. 1B is a detail view of the portion "A" referenced in FIG. 1A.

The skirt panels 3 are formed of low walls each of which has several wall breakthroughs 5 arranged at distances from each other, each of which serves the purpose of accommodating one lens arrangement 6 according to the invention as shown, for example, in FIGS. 3A to 3D. The wall breakthroughs 5 must always be arranged above a line that connects the edges of the steps as shown dotted in FIG. 1B.

Instead of on an escalator with a step band 2, the device according to the invention can also be used on a moving walk with a pallet band or conveyor belt.

FIG. 2A shows a skirt panel 3 or a wall 3 with one of the wall breakthroughs 5. The wall breakthrough 5 is not a cylindrical bored hole but can be made from such a one. Whereas a normal bored hole is cylindrical, the wall breakthrough 5 is not cylindrical in shape, which results from the fact that on at least two opposite edge or side portions, shown in FIGS. 2A to 2D at the left and right, the hole has wall contact surfaces in the form of opposed conical surfaces 5.1.

FIG. 2B shows a wall breakthrough 5 in which the wall contact surface 5.1 extends over the entire axial length or wall thickness of the skirt panel 3. FIG. 2C shows a wall breakthrough 5 in which the wall contact surface 5.1 extends over only part of the axial length or wall thickness of the skirt panel 3. FIG. 2D shows diagrammatically the manufacture of the wall contact surfaces 5.1 with the aid of a conical drill or cutter or punching tool which is used in a first and subsequently in a second processing step, the longitudinal axis of the drill in the first processing step being offset in one direction relative to the longitudinal axis of the original bored hole to form a first surface 5.1 and in the second processing step in the opposite direction to form the other surface 5.1.

FIGS. 3A to 3D show a lens arrangement 20 according to the invention that is intended, and takes such form, as to be accommodated in a wall breakthrough 5.

FIG. 3A shows the lens arrangement 20 with a lens head 6, one or two side attachment portions 6.1, and a lens connecting member 6.2 that in the present example is connected to the lens of the lens head.

Figure 4:
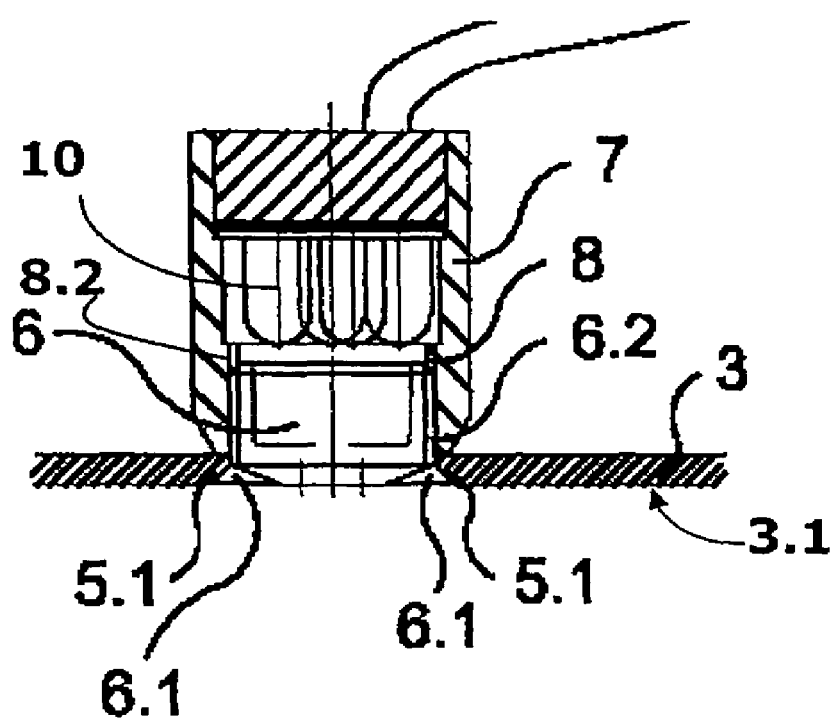
FIG. 4 is a sectional view of a device according to the invention with a lens arrangement and a connection box in an assembled state in a corresponding wall.

In the exemplary embodiment shown, the lens head is bounded at its front end by a flat bounding surface that in the installed state is arranged flush with the surface of the wall 3 of the skirt panel that faces the step band 2. The lens arrangement 20 need not have such a surface-integrable bounding surface, but a lens arrangement of this form proves particularly advantageous since the radiation yield is satisfactory and the lens head is thereby largely protected against damage. A lens head arranged sunk in the wall would impair the radiation, encourage soiling of the skirt panel and lens head and hinder cleaning, while a projecting lens head might possibly improve the radiation yield it would also be highly susceptible to damage. A concave or convex embodiment is nevertheless feasible, as is also a colored embodiment and/or an embodiment with many or few facets. At least the surface of the lens head 6 facing the step band 2 is transparent to radiation that according to FIG. 4 is emitted by a radiation-emitting element 10, for example one or more lamps, that is arranged in a connection box 7. The connection box 7 is described in greater detail below by reference to FIG. 4.

In the installed state, the connecting member 6.2 is intended to project through the wall breakthrough 5.

Alternatively, the lens arrangement's attachment portions 6.1 or an attachment portion 8 of the connection box 7 can partially project through the wall breakthrough 5, or the side attachment portion 8 of the connection box 7 can fully project through the wall breakthrough 5.

In the present exemplary embodiment, the lens-connecting member 6.2 is formed with an external thread and intended in its installed state to be engaged with a complementary connecting member 8.2 in the form of an internal thread that is formed on the inner surface of attachment portion 8 of the connection box 7, thus allowing the connection box to be threadably mounted to the lens head.

The lens arrangement 20, and more specifically the attachment portion 6.1 of the lens head 6, is formed to be complementary to the wall breakthrough 5 and therefore has two side attachment portion surfaces in the form of conical surfaces which are situated opposite each other. The lens arrangement 20 can therefore only be arranged in a pre-specified, desired rotational position in the wall breakthrough and also behaves in more or less self-centering manner when being installed.

FIG. 4 shows a device according to the invention mounted in a wall 3 whose surface 3.1 faces the step band 2 and which has the wall breakthrough 5 with the conical wall contact surfaces 5.1. The lens arrangement 20 is shown with the lens head 6 having the side attachment portions 6.1 with their attachment contact surfaces, and the lens connection member 6.2 with its external thread. Also shown is the connection box 7 with its side attachment portion 8 which is provided with a side connection member 8.2 with an internal thread to mate with the external thread of the lens connection member 6.2.

Assembly takes place in a simple manner, in that from the side 3.1 of the wall 3 that faces the step band 2, the lens arrangement 20 is pushed into the wall breakthrough 5 in such manner that the side attachment portions 6.1 come to rest against the wall contact surfaces 5.1. The connection box 7 is then screwed tight onto the lens connecting member 6.2, with only the connection box 7 but not the lens arrangement 20 turning because the lens arrangement is held in place by the wall contact surfaces 5.1. This type of installation is faster and simpler than installation of conventional devices in which several nuts and welded studs are used, and incorporate savings, since no such further bolts, nuts, washers, or welded studs are needed.

Figures 5A, 5B:
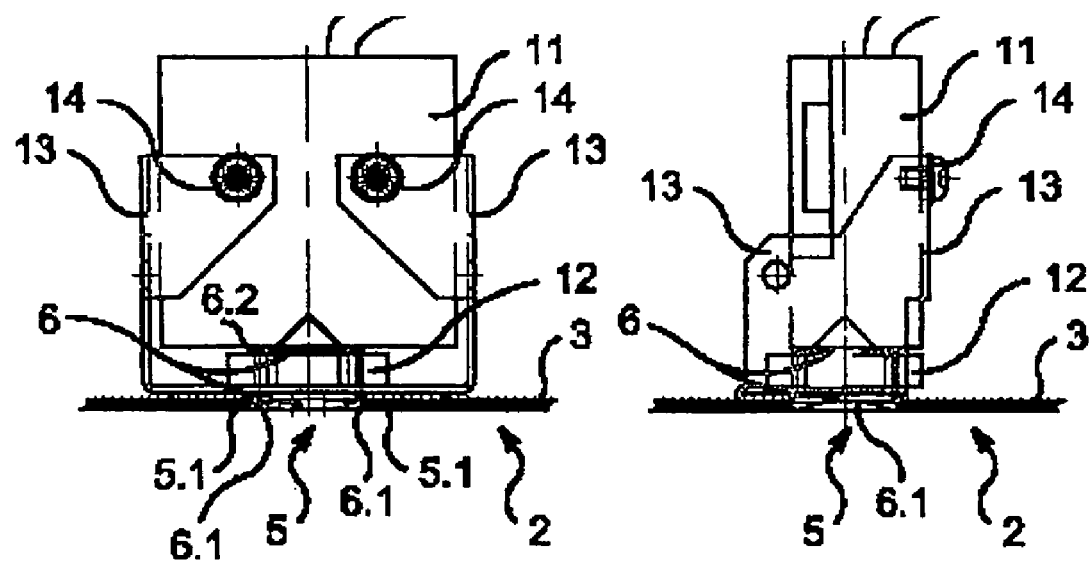
FIG. 5A is a plan view of a device according to the invention with additional fastening means.
FIG. 5B is a side view of the device shown in FIG. 5A.

FIGS. 5A and 5B show a variant of the invention in which a connection-box 11 has a fastening means 13, specifically a connection-box fastening bracket or holder. With such fastening means 13, greater load-bearing capacity and improved mechanical stability are achieved. Thanks to the use of these fastening means 13, a larger and/or heavier connection box 11 can be used, with a greater capacity for installed electronics or with greater or more powerful transmitters and receivers or larger light sources. The fastening means 13 is mounted upon and bolted to the lens connecting member 6.2 with the aid of a metal or plastic nut 12 which forms a box-side connecting member threaded upon the external thread of the lens connecting member 6.2. The fastening means 13 has a round hole that allows it to be pushed onto the connecting member 6.2 at its external thread and fixed non-rotatably with respect thereto with the nut 12. With the aid of screws 14, the connection box 11 itself is assembled to the fastening means 13.

Arranged in the connection box is the radiation-emitting element 10 for which various embodiments are possible, it being possible to use the device according to the invention for different purposes depending on the selected radiation-emitting element 10. Possible in particular are lamps and light sources, light barriers, LEDs, light curtains, infrared light barriers, transmitters and receivers, as well as ultrasound and radar emitters and/or receptors.

We claim:

1. A lens installation comprising a wall-integrable lens arrangement intended to be fastened to a wall and to which a connection housing can be mounted, the lens arrangement having a lens head that is transparent to radiation, an attachment portion and a connecting member, the attachment portion projecting into a wall breakthrough having at least two discrete opposed conical surface portions and the connecting member serving to be connected by a connecting member of the connection housing;

characterized in that the attachment portion of the lens arrangement is formed complementary to the breakthrough and has at least two discrete attachment contact surfaces in the form of conical surfaces positioned opposite each other in respect to a longitudinal axis of the attachment portion and complementary to the conical surface portions of the wall breakthrough such that it is inserted and is maintained in a pre-specified fixed horizontal rotational position defined by the position of the attachment conical surfaces of the wall breakthrough and is secure against rotation in the wall breakthrough.

2. A lens installation, comprising a wall-integrated lens system comprising a connection housing, a lens arrangement and a wall, the connection housing having at least one of a radiation-emitting or a radiation-absorbing element, being arranged on a first side of the wall, and having an attachment portion and a connecting member; the lens arrangement having a lens head that is transparent to the radiation of the radiation-emitting and radiation-absorbing element in a direction outwardly from a second side of the wall and having an attachment portion and a connecting member; the wall having a non central-symmetric wall breakthrough through which at least one of the connection housing and lens arrangement attachment portions at least partially project, the housing and lens arrangement connecting members being in mutual engagement;

characterized in that the wall breakthrough and at least one of the at least one attachment portions projecting through the wall breakthrough are each complementarily formed with at least two discrete opposed attachment contact surfaces in the form of conical surfaces portions, and are inter-engaged whereby the attachment conical surfaces are positioned opposite each other in respect to a longitudinal axis of the attachment portion such that the lens head is maintained in a pre-specified fixed horizontal or rotational position defined by the position of the attachment conical surfaces of the wall breakthrough and secured in the position against rotation.

3. The lens installation according to claim 2, further characterized in that the lens head has a forward face that is flush with a surface of the wall on the second side of the wall.

4. The lens installation according to claim 2, further characterized in that the lens head has a forward face that is concave and/or convex with respect to a surface of the wall on the second side of the wall.

5. The lens installation according to claim 2, 3 or 4, further characterized in that the lens arrangement contains at least one of a reflector arrangement and a ray-forming element for directing, influencing and/or bundling the radiation.

6. The lens installation according to claim 2, 3 or 4, further characterized in that the wall breakthrough and the attachment portion with which it is engaged are each bounded by at least two partly overlapping cylindrical surfaces.

7. The lens installation according to claim 2, 3 or 4, further characterized in that the wall breakthrough has a wall contact surface and the attachment portion with which it is engaged has an attachment contact surface, the contact surfaces at least partly resting against each other and being rotationally asymmetrical with reference to an axis perpendicular to the wall.

8. The lens installation according to claim 2, further characterized in that the attachment portion of the connection housing has a fastening means for fastening the connection housing to the lens arrangement attachment portion.

9. The lens installation according to of claim 6, characterized in that the engaged attachment portion is the lens arrangement attachment portion and in that the lens arrangement connecting member is a thread.

10. The lens installation according to claim 2, further characterized in that the radiation-emitting element is a light-emitting element and the lens head is made at least in part of a material that is transparent to light.

11. A method of assembling the lens installation according to claim 2, characterized in that the lens arrangement is pushed from the side of a wall that faces a step-band or pallet-band side of a transportation installation into the wall breakthrough in such manner that contact surfaces of the wall and the lens arrangement rest against each other in a non-rotatable manner and that the connection box is fastened directly or indirectly to the lens arrangement.

12. An escalator or moving walk or elevator installation comprising a wall and a lens installation according to claim 2 mounted in the wall.

13. The escalator or moving walk according to claim 12, characterized in that the wall is a lateral or vertical skirt panel or a lateral or straight or sloping balustrade of the installation.

14. The escalator or moving walk according to claim 12 or 13, characterized in that the wall-integrable lens arrangement is located and arranged to light, illuminate or monitor the escalator or moving walk.

* * * * *